Aug. 29, 1939.  H. J. DE COUDRES  2,171,059
UNIVERSAL JOINT
Filed March 9, 1938
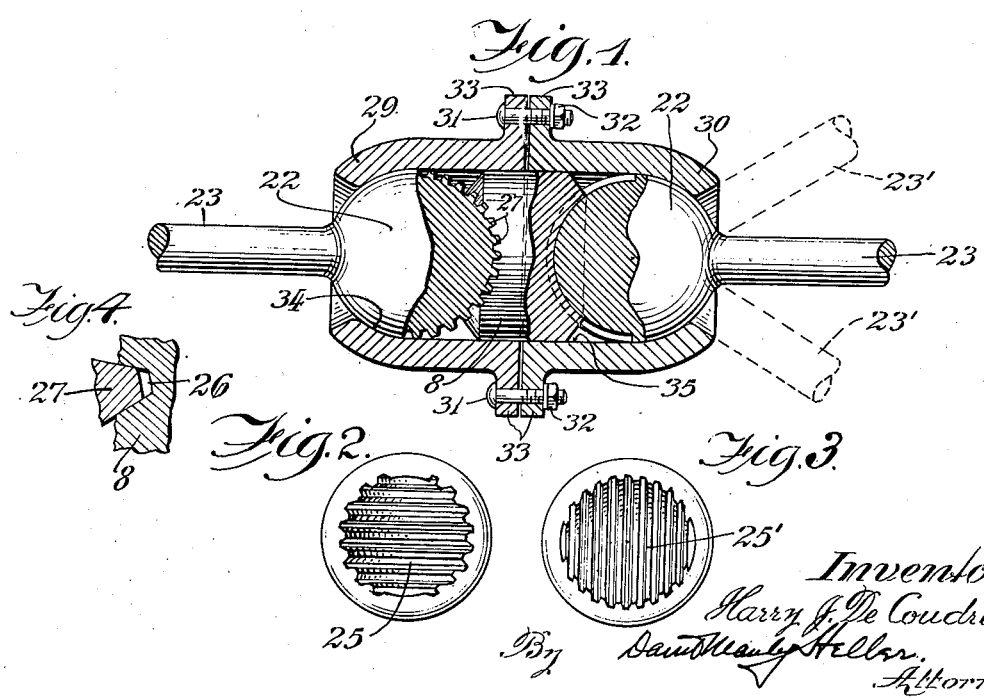

Patented Aug. 29, 1939

2,171,059

UNITED STATES PATENT OFFICE 2,171,059

UNIVERSAL JOINT

Harry J. De Coudres, Chicago, Ill.

Application March 9, 1938, Serial No. 194,907

3 Claims. (Cl. 64—7)

This invention relates to universal joints and more particularly to those employed in automotive vehicles and machine tools.

The primary object of the invention is the provision of a strong universal joint where the positive engagement of the respective parts, is a contributing factor to the efficient transmission of power and motion, whereby lost motion and slippage are totally eliminated.

Another object of the invention is the provision of a simple, practical, durable, and efficient structure, also economical to manufacture.

Another object of my invention is the provision of a universal joint which can be adjusted for wear.

Other objects and advantages of the invention will become apparent from the following detailed description, taken in connection with the accompanying drawing, in which Fig. 1 is a longitudinal cross-sectional view of a form of my invention.

Fig. 2 is an end view showing the toothed structure of member 8.

Fig. 3 is another end view showing the toothed structure on the opposite side of member 8 showing teeth cut at right angles to those on the end illustrated in Figure 5.

Fig. 4 represents an enlarged view showing the toothed structure employed to take up wear.

While the invention is susceptible of various modifications and alternative constructions, I have shown in the drawing and will herein describe preferred forms, but it is to be understood that I do not thereby intend to limit the invention to the specific forms disclosed, but intend to cover all modifications and alternative structures falling within the spirit and scope of my invention as expressed in the appended claims.

By reference to the drawing, where like numerals represent like parts:

In Fig. 1 I show a modified form of my invention, where are shown two ball members 22 exactly similar in construction, made preferably of metal, and having a toothed structure extending substantially over an area approximately 50% of their individual spherical area and having extensions 23 which are attached to driving and driven members of a transmission. The ball members 22 are assembled with the teeth portions at right angles to one another, and mesh with part 8 which is a circular metal piece with teeth 25' cut on one face, and teeth 25 cut on the opposite face in planes at right angles to one another.

In Figures 2 and 3 this angular relation is illustrated in further detail. The teeth are preferably of the "acme" type, which permit of adjustment for wear, as illustrated at 26 and 27 in Figure 4. The three members, namely member 8 and the two ball members 23 are held together in a housing 28 made up of two halves 29 and 30 each exactly alike and held together by screws 31 and nuts 32 thru flanges 33.

Both the member 29 and 30 each have a socket portion 34 spherical in shape and a cylindrical bore 35 to receive the outer diameter of member 8 same being driven in half-way into each of members 29 and 30. These coupling members 29 and 30 are also provided with openings 36 to provide clearance for the extensions 23 when the joint is in motion.

In between the members 29 and 30 there is a "shim" of say .020" approximately, more or less, which is replaceable with a thinner "shim" when the joint parts wear to allow the slack to be taken up. It can be thus very readily noted that my construction offers a simple, practical fine fitting universal joint eliminating the lost motion and incidental strain to which a joint of this type is usually subjected, and hence provides a smooth moving joint delivering the maximum of efficiency in power or motion transmission.

In looking at Figure 1 the numerals 23' show the motion of one of the ball members in a horizontal direction, whereas, the other ball member moves in a vertical direction, providing similar action and resultant motion as is obtainable from the commonly known universal joint comprising two hinged forked members attached swivellably to a central "cross" member.

In operation the use of my invention, in connection with power or motion transmission devices, provides smooth performance and it is far superior to any of the present universal joints on the market. In addition it provides other advantages, such as longer life by eliminating strain on the joint, and adjustment features for wear which make for practical economy as a result of its application and use. I wish to particularly point out, that the teeth used in my universal joint provide a positive gripping and connection for the component parts, and hence the strain is proportionally distributed to the many teeth in mesh, which in turn reduces and minimizes the strain at any one point, whereas in the present joints the strain is confined to only four points, one at a time, so that the strain is borne by the one point.

Having thus described my invention, what I claim and desire to secure by Letters Patent is:

1. In a universal joint, the combination of two toothed ball members, an intermediate member, having arcuate teeth cut at right angles on opposed faces, and adapted to co-act with said toothed ball members, a housing made of two halves, and a "shim" member assembled between the two halves of said housing member.

2. In a universal joint, the combination of two toothed ball members provided with cross-sectionally gear shaped teeth covering substantially half of the peripheral surface of each ball member, an intermediate member having two oppositely disposed toothed concavities the teeth in one concavity cut at right angles to the teeth in the opposite concavity and adapted to mesh with the teeth of said ball members, a housing made of at least two portions, and a "shim" member assembled between the portions of said housing member in order to permit taking up any wear caused by extensive use.

3. A universal joint, comprising in combination two toothed ball members, an intermediate member having teeth cut at right angles on opposed faces, and adapted to mesh with said toothed ball members, and a housing, made of two sections, adapted to hold in operative assembly said ball members and the said intermediate member.

HARRY J. DE COUDRES.